US009975749B2

(12) United States Patent
Roberson et al.

(10) Patent No.: US 9,975,749 B2
(45) Date of Patent: May 22, 2018

(54) MOBILE VEHICLE SERVICING SYSTEM

(71) Applicant: Mobile Automotive Solutions, LLC, Alma, GA (US)

(72) Inventors: Gregory Howard Roberson, Alma, GA (US); Gary Archibald Smith, Alma, GA (US)

(73) Assignee: Mobile Automotive Solutions, LLC, Alma, GA (US)

(*) Notice: Subject to any disclaimer, the term of this patent is extended or adjusted under 35 U.S.C. 154(b) by 0 days. days.

(21) Appl. No.: 14/731,207

(22) Filed: Jun. 4, 2015

(65) Prior Publication Data
US 2016/0052758 A1 Feb. 25, 2016

Related U.S. Application Data

(60) Provisional application No. 62/070,344, filed on Aug. 21, 2014.

(51) Int. Cl.
B66F 7/20 (2006.01)
B66F 7/28 (2006.01)
B60P 3/14 (2006.01)
B60S 5/00 (2006.01)

(52) U.S. Cl.
CPC ............... B66F 7/20 (2013.01); B60P 3/14 (2013.01); B66F 7/28 (2013.01); B60S 5/00 (2013.01); Y10T 137/3802 (2015.04)

(58) Field of Classification Search
CPC ...... B66F 7/00; B66F 7/22; B66F 7/28; B66F 11/04; B60P 3/14; Y10T 137/3802
See application file for complete search history.

(56) References Cited

U.S. PATENT DOCUMENTS

| | | | |
|---|---|---|---|
| 1,803,810 A * | 5/1931 | Sage .................. | B66F 7/00 187/204 |
| 3,095,062 A | 6/1963 | Neely | |
| 3,308,845 A * | 3/1967 | Bellas et al. ............. | B60P 3/14 137/234.6 |
| 4,724,875 A | 2/1988 | Baldwin et al. | |
| 4,775,067 A | 10/1988 | Mount | |
| 4,981,318 A | 1/1991 | Doane et al. | |
| 5,242,032 A | 9/1993 | Prestwood et al. | |
| 5,349,980 A * | 9/1994 | Spiegel .................. | B60P 3/14 137/1 |
| 5,450,928 A | 9/1995 | Isogai | |
| 5,833,294 A | 11/1998 | Williams et al. | |
| 5,904,339 A | 5/1999 | Flinn | |
| 6,135,501 A | 10/2000 | Rinehart | |
| 6,173,941 B1 | 1/2001 | Johnston | |
| 6,296,028 B1 | 10/2001 | Oakland | |
| 6,752,244 B2 | 6/2004 | Sheppard et al. | |
| 7,143,869 B1 | 12/2006 | Chance | |
| 7,520,711 B2 * | 4/2009 | Lee .................. | B66F 7/00 182/131 |

(Continued)

Primary Examiner — Kevin Lee
(74) Attorney, Agent, or Firm — Clements Bernard Walker PLLC; Richard A. Walker; Christopher L. Bernard

(57) ABSTRACT

A mobile vehicle servicing system includes a trailer having an elongated bed with peripheral vertical lip, four vertical stanchions disposed about the sides of the bed each of which support four corresponding carriages that are connected to a lift platform and are positionable by four actuators. The system further includes an oil supply and a used oil reservoir.

10 Claims, 4 Drawing Sheets

(56) References Cited

U.S. PATENT DOCUMENTS

| | | |
|---|---|---|
| 7,602,143 B2 | 10/2009 | Capizzo |
| 8,286,942 B2 | 10/2012 | Thesier |
| 9,499,378 B2 * | 11/2016 | Kelly et al. ............... B66F 7/10 |
| 2005/0254926 A1 | 11/2005 | Howison |
| 2010/0038181 A1 | 2/2010 | Jones |
| 2014/0119864 A1 | 5/2014 | Kiragu |

* cited by examiner

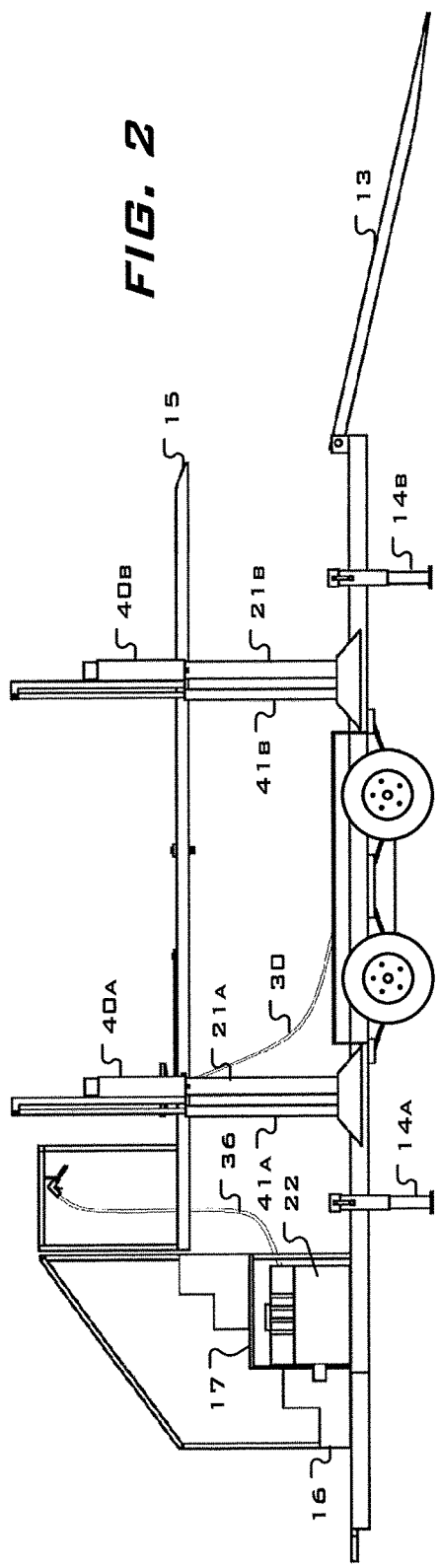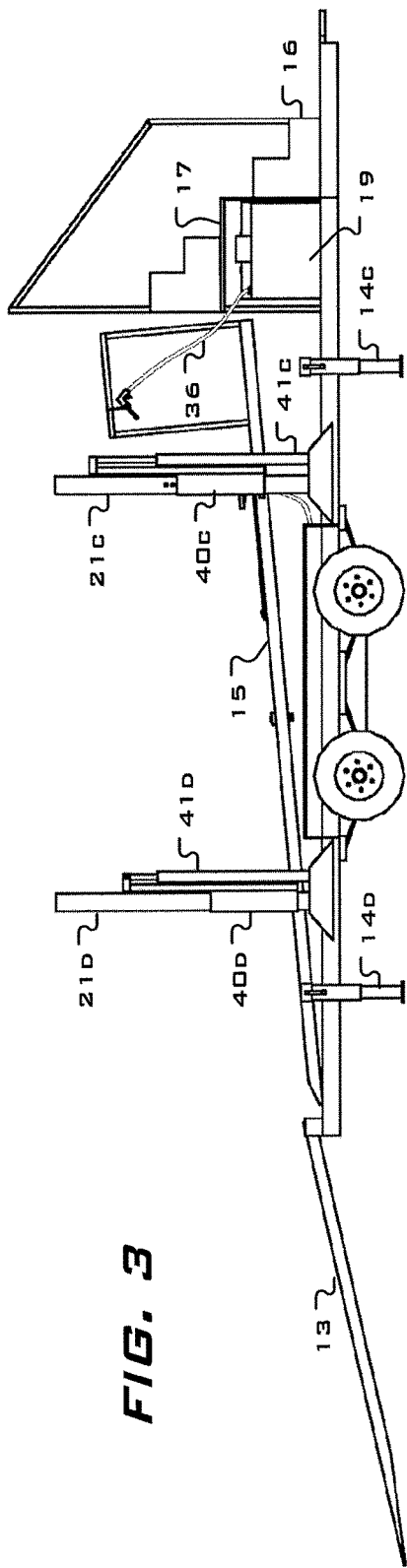

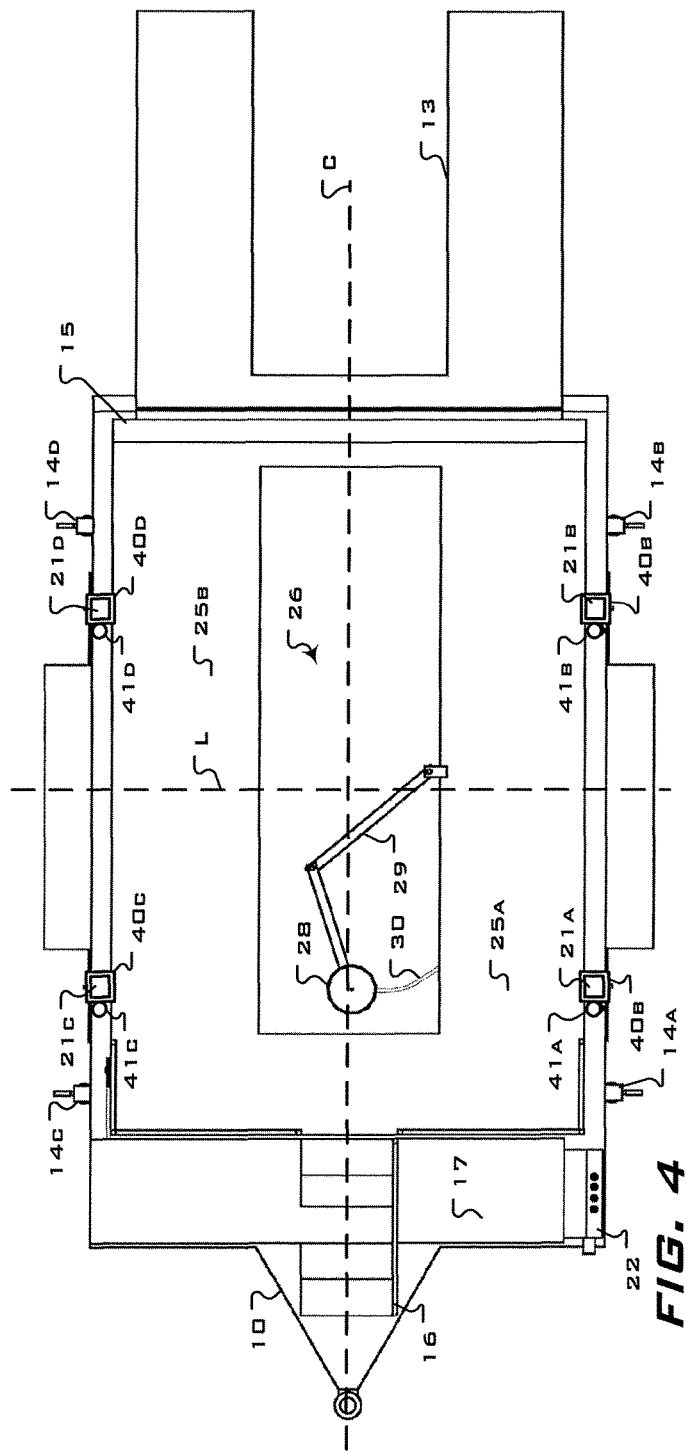
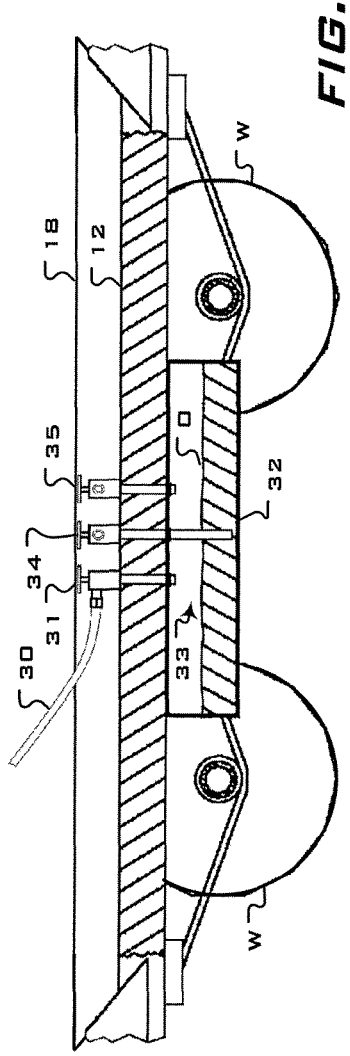
FIG. 4
FIG. 5

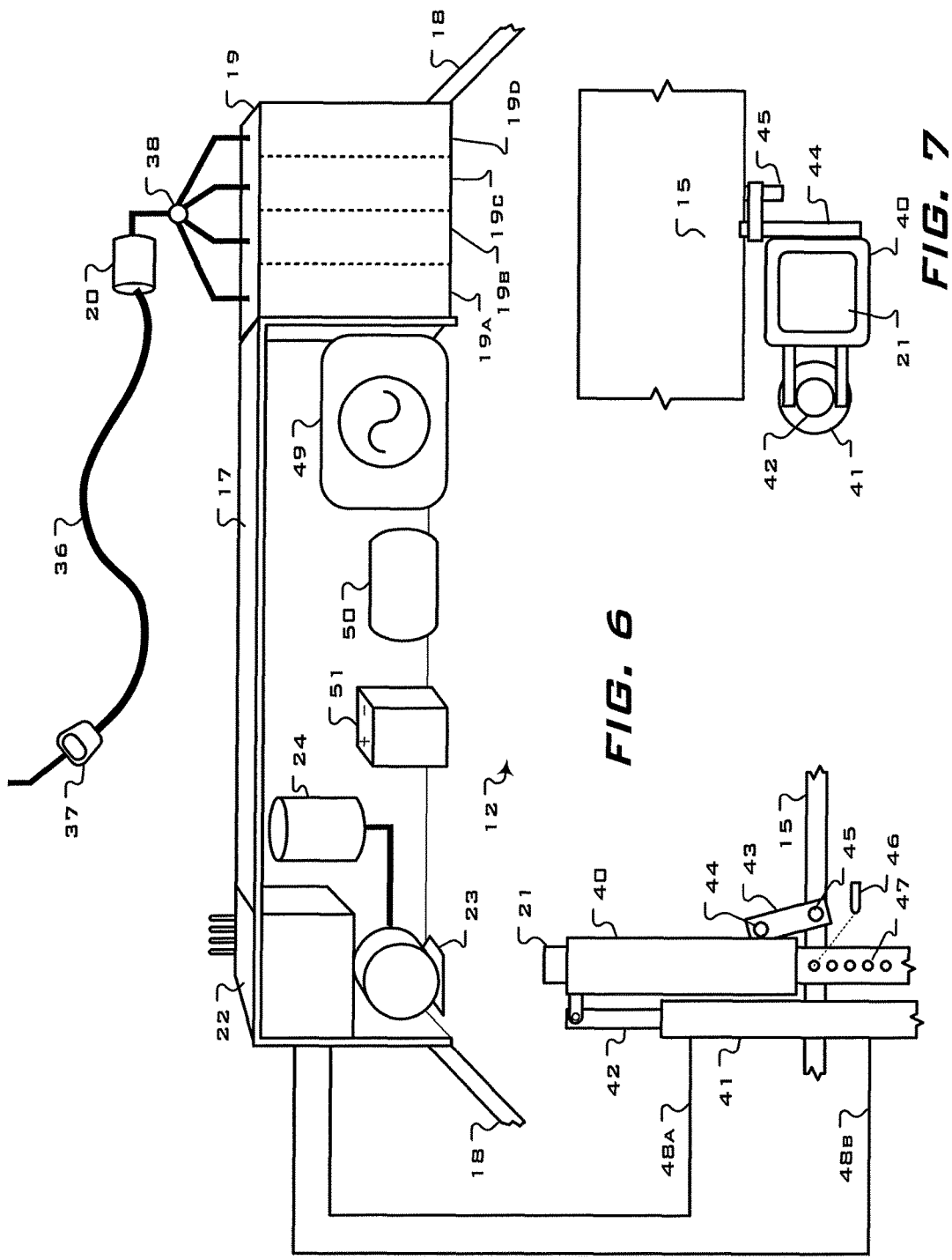

MOBILE VEHICLE SERVICING SYSTEM

CROSS-REFERENCE TO RELATED APPLICATIONS

This application claims priority to U.S. Provisional Application No. 62/070,344 filed Aug. 21, 2014 which is incorporated by reference as if fully set forth herein.

BRIEF DESCRIPTION OF THE DRAWINGS

The mobile vehicle servicing system is described with reference to the accompanying drawings. In the drawings, like reference numbers indicate identical or functionally similar elements.

FIG. 2 is an elevation view from the left of the system of FIG. 1, illustrating the lift platform in a raised position;

FIG. 3 is an elevation view from the right of the system of FIG. 1, illustrating the lift platform in a lowered position;

FIG. 4 is a top plan view of the system of FIG. 1;

FIG. 5 is a cutaway view of an exemplary discharge reservoir for use with the system of FIG. 1;

FIG. 6 is a view of the front area of the trailer showing a number of components; and FIG. 7 is a detailed top view of an exemplary arrangement of a hydraulic actuator coupled with a carriage assembly.

DETAILED DESCRIPTION

Figure 1:
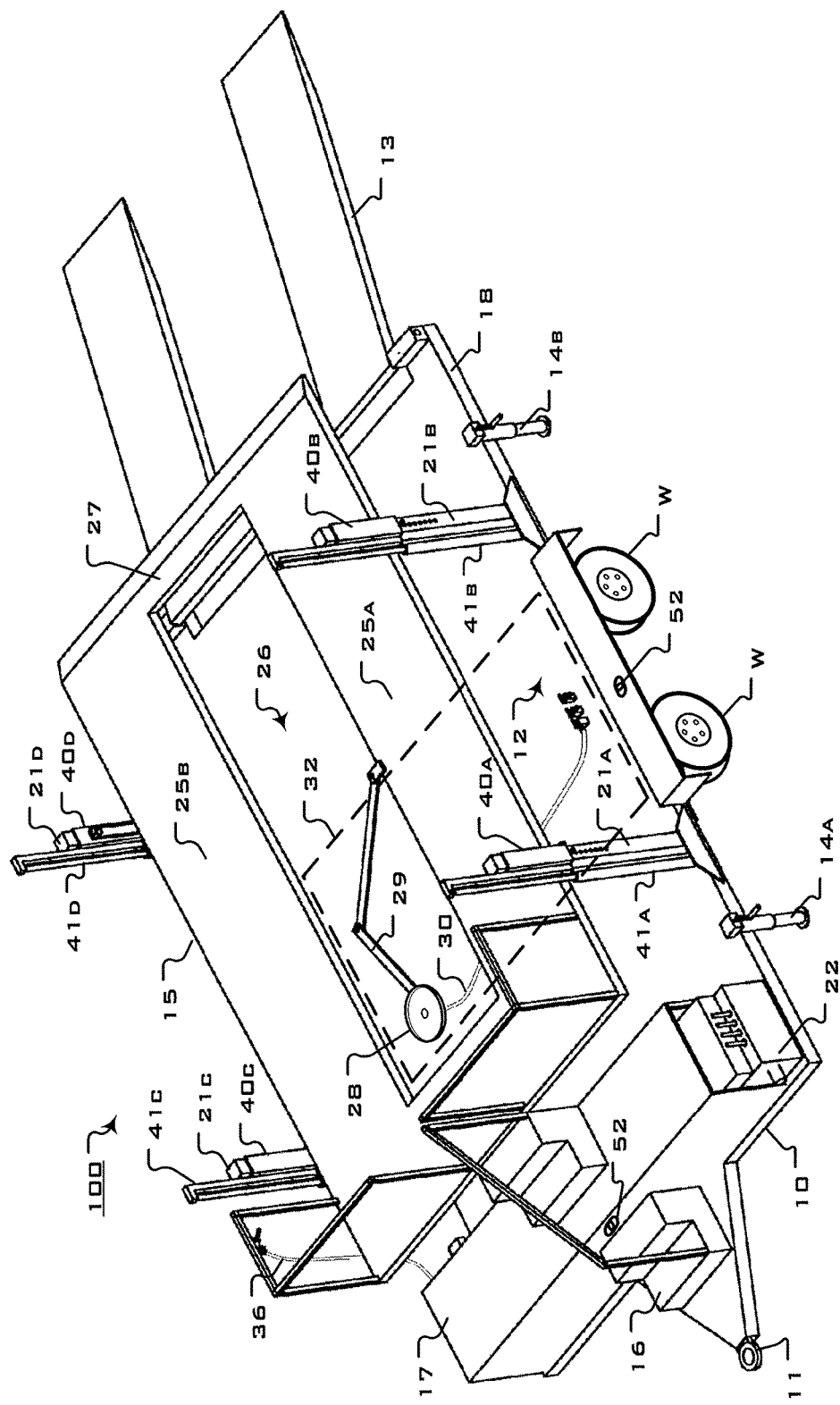
FIG. 1 is a top perspective view of an exemplary mobile vehicle servicing system.

The various embodiments of the mobile vehicle servicing system and their advantages are best understood by referring to FIGS. 1 through 7 of the drawings. The elements of the drawings are not necessarily to scale, emphasis instead being placed upon clearly illustrating the novel features and principles of operation. Throughout the drawings, like numerals are used for like and corresponding parts of the various drawings.

For purposes of description herein, spatial terms such as "top," "bottom," "upper," "lower," "right," "left," "rear," "front," "vertical," "horizontal," and variants or synonyms thereof are to be understood with reference to a towing vehicle configured to tow a trailer hitched to the towing vehicle's rear. However, it is to be understood that the apparatuses described herein may assume various alternative orientations or relative positions and still be within the scope of the claims, except where expressly specified to the contrary.

Reference in the specification to "an embodiment," "one embodiment," "various embodiments," or any variant thereof means that a particular feature or aspect described in conjunction with the particular embodiment is included in at least one embodiment. Thus, phrases such as "in one embodiment," "in another embodiment," or variations thereof throughout the specification are not necessarily all referring to its respective embodiment. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

An exemplary mobile vehicle servicing system 100 comprises a trailer 10 including a suitable hitch 11 extending forward from the front of the trailer 10 and an elongated bed 12 supported by wheels W. The elongated bed 12 includes a vertical lip 18 surrounding the bed periphery and extending upward from the edge of the bed 12. A ramp 13 is hingedly attached to the rear of the trailer 10. Four vertical stanchions 21a-d are disposed about the periphery of the trailer bed 12. Each stanchion 21a-d supports a vertically oriented carriage 40a-d.

The carriages 40a-d are affixed to the periphery of a vehicle lift platform 15 disposed between the stanchions 21a-d. A plurality of outriggers 14a-d is attached to the outer edges of the elongated bed 12. Outriggers 14a-d may be either permanently attached or removably connectable to the trailer bed 12. The trailer 10 further comprises a raised stationary platform 17 located at near the front of the trailer and accessible by steps 16. The system also comprises an oil delivery subsystem including a fresh oil supply reservoir 19 and an oil pump 20.

As can be seen in greater detail in FIGS. 6 & 7, a carriage 40 may comprise a tube or sleeve that surrounds the stanchion 21 and is in sliding engagement with the surface of the stanchion 21. In one embodiment, carriages 40a-d are pivotally connected to the outer periphery of the lift platform 15 and are configured with a pin 44 affixed to the carriage 40 exterior and having an inwardly disposed free end pivotally engaged with one end of a tie bar 43. The other end of the tie bar 43 is pivotally engaged with a second pin 45 extending laterally outward from the outward edge of the platform 15.

Carriages 40a-d are driven by a hydraulic system comprising a plurality of hydraulic actuators 41a-d operative to raise and lower the carriages 40a-d along the stanchions 21a-d. Each hydraulic actuator 41 comprises a piston 42 connected to the carriage 40.

Hydraulic actuators 41a-d are responsive to a hydraulic control apparatus 22 to which is coupled a hydraulic pump 23 and fluid reservoir 24. In one embodiment, all actuators 41a-d may be driven in a synchronized manner resulting in a uniform raising of the lift platform 15. In another embodiment, each actuator 41 may be advantageously separately controllable, i.e., actuated independently of the other actuators 41a-d. In yet another embodiment, the hydraulic system may also actuate outriggers 14a-d. The system 100 further comprises an electric generator 49, an air compressor 50, and a battery 51. These components are preferably disposed near the front of the trailer 10 and may be stored under the platform 17.

Vehicle lift platform 15 preferably comprises two spaced-apart, parallel, elongated runners 25a, b oriented longitudinally with respect to the trailer 10 with an elongated open space 26 in between. The runners 25a, b may be connected by a plurality of transverse beams 27. A movable fluid discharge basin 28 is supported by a swing arm 29 pivotally connected at one end to the lift platform 15 and configured to be positionable in the horizontal plane within the elongated space 26 defined between the runners 25a, b. The basin 28 comprises a drain in communication with a drain hose 30 having a free end connectable to a discharge inlet 31. Discharge inlet 31 comprises vertical pipe that extends upward from the trailer bed 12 and through the trailer bed 12, opening into a discharge reservoir 32 defining a chamber 33 for the collection of fluids that is mounted to the bottom surface of the trailer bed 12. Preferably, discharge reservoir 32 is disposed midway between the lateral sides of the trailer 10 and generally midway along the trailer's longitudinal axis C. An outlet pipe 34 having an open end in communication with discharged oil O contained within the chamber 33 extends through the trailer bed 12 and above the top surface thereof. The third fixture comprises an air inlet 35 also in communication with the chamber 33 and having an end configured to be coupled to a compressed air source 50.

New oil is retained in a oil supply reservoir 19 and is drawn therefrom via an oil pump 20 through a hose 36. The hose 36 may be configured with a meter 37 to gauge the volume of oil conveyed through the hose 36. In another embodiment, oil supply reservoir 19 may be advantageously configured with a plurality of separate oil supply reservoirs 19a-d. Different vehicle models require different oil viscosity grades as defined by the Society of Automotive Engineers (SAE) in the SAE J300. Accordingly, each of the plurality of oil supply reservoirs 19a-d may contain a corresponding plurality of motor oils of varying viscosities in order to be able to service a greater variety of vehicles. Thus, in this embodiment, the oil supply reservoirs 19a-d may be coupled to supply hose 36 through a switch 38 that permits the operator to select the appropriate motor oil for the vehicle being serviced.

In operation, the lift platform 15 starts in a lowered position as shown in FIG. 3. Outriggers 14a-d are deployed to not only stabilize the trailer 10, but to insure the trailer 10 is generally level in the longitudinal and lateral axes C, L, respectively. To this end, trailer 10 is preferably provided with orientation indicators 52 (e.g., a liquid bubble level) that provide the operator with indication of the degree to which the trailer is level in both axes. Vehicle is driven onto the runners 25a, b of the lift platform 15 via the ramp 13 and preferably secured to the lift platform 15 with chains or straps for safety. The lift platform 15 may include a plurality of chocks 39a-d transversely disposed on each of the runners 25a, b. When loading the vehicle on the lift platform 15, the vehicle is urged forward until the vehicle's wheels contact the chocks 39a-d. Chocks 39a-d, therefore, provide some measure of resistance to the vehicle rolling forward once the vehicle is on the lift platform 15. Once the vehicle is secure, the operator may raise the lift platform 15.

The lift platform is raised through operation of the hydraulic control apparatus 22 which is operative to port fluid under pressure to each of the hydraulic actuators 41a-d and raise their respective pistons 42 vertically upward, thereby drawing the carriages 40a-d and thus the lift platform 15 upward as well. Once the platform 15 is raised to a sufficient height, a safety pin 46 is inserted into a hole 47 bored through each stanchion 21 to provide a failsafe in the event a hydraulic actuator 41 fails by preventing the carriage 40 from sliding back down the stanchion 21. Next, the operator may have access to the vehicle undercarriage.

When servicing vehicle oil, the operator positions the discharge basin 28 underneath the vehicle's oil drain, removes the drain plug and allows the used oil to fall into the basin 28 where it drains into the drain hose 30 and is conveyed to the discharge reservoir 32 underneath the through the discharge inlet 31. Suitable new oil is supplied from the oil supply reservoir 19 through oil pump 20 which impels the new oil through the oil hose 36 and into the vehicle. Advantageously, in the event of spillage the lip 18 surrounding the trailer bed 12 prevents oil from spilling into the environment.

Used oil O is held within the chamber 33 defined by the reservoir 32 until full or until an earlier opportunity to safety dispose of the used oil O arises. To dispose of the used oil O, a suitable fluid conduit (not shown) is coupled to the outlet pipe 34 while a compressed air source 50 is coupled to the air inlet 35. Compressed air is applied to the chamber 33 to pressurize it thereby forcing the used oil out through the outlet 34.

As described above, hydraulic control apparatus 22 may be configured to operate each actuator independently. This can allow the operator to tilt the platform to some degree in order to allow all the oil from the vehicle to drain.

While particular embodiments have been described, it will be understood, however, that any invention appertaining to the system described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A mobile vehicle servicing system comprising:
    a trailer having an elongated bed and configured to be hitched to a towing vehicle, said bed having an upward extending lip surrounding a lateral periphery of said bed;
    four vertical stanchions, a front pair disposed in parallel toward a front of the bed, and a rear pair disposed in parallel toward a rear of the bed;
    four carriages, each of said carriages configured to travel vertically along each said stanchion;
    four actuators, each of said actuators coupled to each of said carriages;
    an actuator control system for actuating said four actuators;
    a lift platform connected to said carriages;
    an oil supply; and
    a used oil reservoir disposed underneath the elongated bed and defining a chamber in communication with an oil inlet, an oil outlet, and an air inlet.
2. The mobile vehicle servicing system of claim 1, further comprising a compressed air source configured to be coupled to said air inlet.
3. The mobile vehicle servicing system of claim 1, further comprising at least one of a generator and a battery.
4. The mobile vehicle servicing system of claim 1, further comprising a ramp hingedly connected to a rear end of said trailer.
5. The mobile vehicle servicing system of claim 1, further comprising a discharge basin for collecting used oil drained from a serviced vehicle, said basin having a drain in communication with a drain hose, an end of which is coupled to said oil inlet.
6. The mobile vehicle servicing system of claim 1, further comprising at least four outriggers connected to a lateral periphery of said trailer.
7. The mobile vehicle servicing system of claim 6, wherein said at least four outriggers are removably connectable with said trailer.
8. The mobile vehicle servicing system of claim 7, wherein said outriggers are operable to be controlled by said actuator control system.
9. The mobile vehicle servicing system of claim 1, wherein said actuators are independently actuatable.
10. The mobile vehicle servicing system of claim 1, wherein said oil supply comprises a plurality of oils of various grades.

* * * * *